Figure 1:
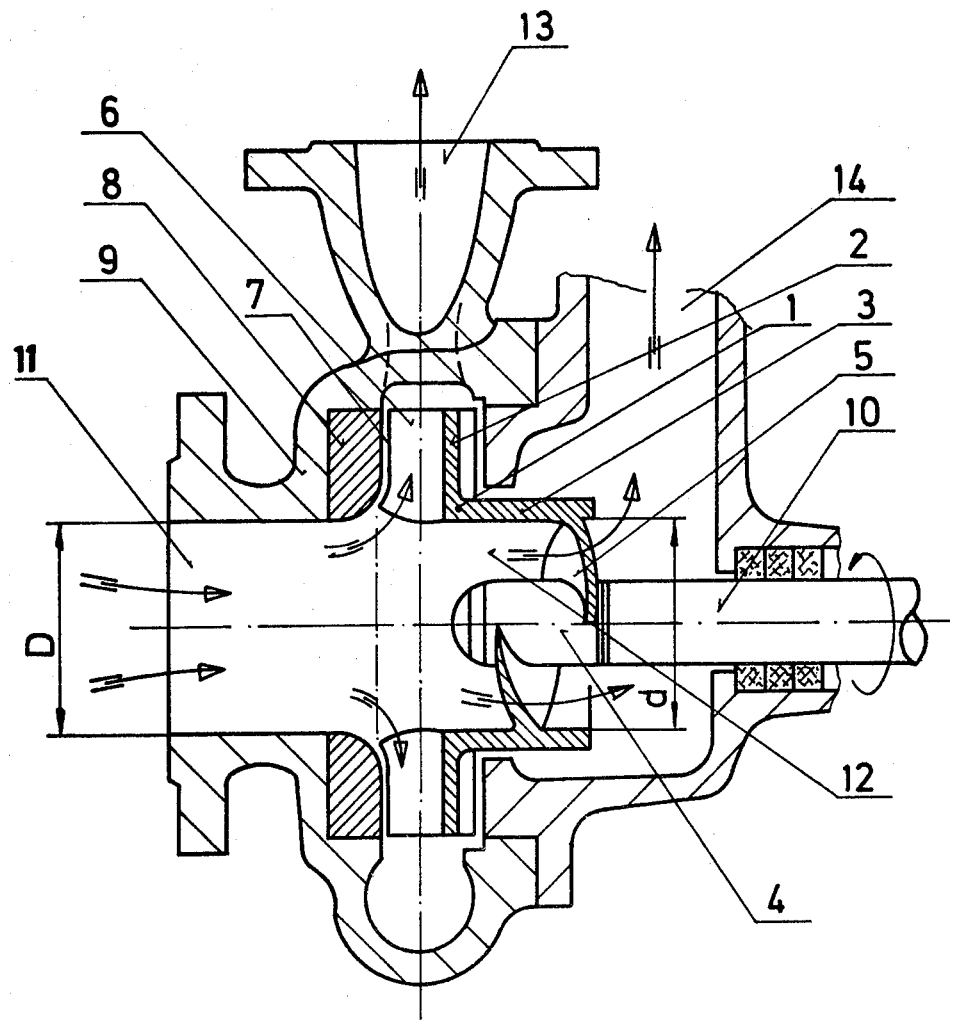

United States Patent [19]

Niskanen

[11] 4,273,562
[45] Jun. 16, 1981

[54] METHOD AND APPARATUS FOR PUMPING GASEOUS LIQUIDS AND SEPARATING THE GASEOUS COMPONENTS THEREFROM

[75] Inventor: Toivo Niskanen, Hamina, Finland

[73] Assignee: A. Ahlstrom Osakeyhtio, Noormarkku, Finland

[21] Appl. No.: 80,344

[22] Filed: Oct. 1, 1979

[51] Int. Cl.$^3$ ............... B01D 19/00; F03B 11/04
[52] U.S. Cl. ............................... 55/52; 55/203; 415/168
[58] Field of Search ............ 55/1, 184, 201, 203, 55/400, 403, 408, 409, 52; 415/121 R, 143, 144, 168; 233/27, 28, DIG. 1

[56] References Cited

U.S. PATENT DOCUMENTS

| | | | |
|---|---|---|---|
| 2,276,824 | 3/1942 | Carruthers | 415/143 |
| 2,463,251 | 3/1949 | Curtis | 55/199 |
| 2,575,568 | 11/1951 | Topanelian, Jr. | 55/400 |
| 2,815,717 | 12/1957 | Szwargulski et al. | 55/201 |
| 3,271,933 | 9/1966 | Harker et al. | 55/203 |
| 3,290,864 | 12/1966 | Harker et al. | 55/203 |
| 3,944,406 | 3/1976 | Jagusch et al. | 415/98 |

FOREIGN PATENT DOCUMENTS

| | | | |
|---|---|---|---|
| 753408 | 12/1970 | Belgium | 55/203 |
| 276593 | 2/1914 | Fed. Rep. of Germany . | |
| 743950 | 11/1943 | Fed. Rep. of Germany | 415/144 |
| 571655 | 1/1976 | Switzerland . | |
| 1218023 | 1/1971 | United Kingdom | 415/143 |
| 136185 | 10/1960 | U.S.S.R. | 415/143 |
| 395119 | 1/1974 | U.S.S.R. | 55/203 |
| 631676 | 11/1978 | U.S.S.R. | 415/143 |

Primary Examiner—David L. Lacey
Attorney, Agent, or Firm—Bucknam and Archer

[57] ABSTRACT

A method and apparatus for pumping gaseous liquids in a centrifugal pump having a rotary impeller with an opening through the impeller. Liquid flowing into the pump is divided into two fluid streams at the impeller, one stream being the radial flow to the high pressure discharge part and the other stream containing the greater part of the gaseous component and directed to flow through the impeller opening. The impeller has surfaces that extend into this opening to positively drive therethrough the gaseous component stream.

4 Claims, 2 Drawing Figures

METHOD AND APPARATUS FOR PUMPING GASEOUS LIQUIDS AND SEPARATING THE GASEOUS COMPONENTS THEREFROM

This invention relates to a method and apparatus for pumping gaseous liquids or suspensions by means of a centrifugal pump.

Centrifugal pumps are often used in pumping cases, where the liquid to be pumped contains gases. The gas may emanate from outside the process, e.g. the air existing in the stock, or gas formed during the process as e.g. due to stem generation in the suction port of a condensate pump impeller, depending on a local decrease in pressure.

In centrifugal pumps the gases, being lighter, tend to migrate towards the center of the impeller suction port, and to gradually fill up the vane passages so that a water ring is formed on the outer surface of the impeller. The inner diameter of the ring grows until the air at last prevents the liquid from running into the vane passages and the pumping action ceases.

A conventional centrifugal pump operates trouble-free when the maximum value of the gas content is 1–3 percent of volume, this depending on the pump type. Greater air percentages decrease the yield values of the pump and correspondingly the efficiency.

Efforts have been made to increase the gas margin tolerance of centrifugal pumps in two principally different ways:

By providng regions of turbulent flow in the vane passages where the pressure is less than in the surrounding space. The gas moves into turbulent zones due to the influence of the whirls, mixes with the running liquid, and flows with it out of the pump. The gases moving through the pump reduces the pumping capacity, and the greater the percentage of gas, the more the pumping capacity decreases.

The gases are gathered in front of the impler, and are guided out of the pump, e.g. to the suction reservoir, along borings in the housing or in the shaft. The borings are directed upwards to allow the gases to exit due to less density. This solution is good except for the fact that it is suitable only for clean liquids. Impurities clogg the gas outlet pipes.

The purpose of this invention is to provide a method and an apparatus for pumping gaseous suspensions and slurries without the danger of clogging.

A characteristic feature of the invention is that the liquid flowing to the pump is divided into two fluid streams inide the impeller, one of which is guided to flow through the impeller vane passages and the other through the opening/openings in the back plate of the impeller, causing the greater part of the gases to exit from the pump together with the liquid which flows through the back plate.

According to a preferred embodiment, an opening in the back plate of the impeller is surrounded by a ring. Inside the ring there is a plate forming a screw surface by which the impeller is connected to the shaft, and which transports by-pass liquid.

The invention is described in more detail below with reference to the enclosed figures, of which FIG. 1 shows the pump according to the invention, and FIG. 2 a cross section of one adaption of the pump.

FIG. 1 shows a centrifugal pump comprising a half-open impeller 1, the back plate 2 is provided with a ring 3 of which is connected to the hub 4 by a plate 5 forming the screw surface. The impeller 1 has vanes 7 defining flow passages 6. The guide 8, which forms the other side of the flow passage, is fastened to the housing 9. The impeller is fastened by the hub 4 to a rotating shaft 10. The pump also has a suction inlet 11, a by-pass opening 12 on the back plate of the impeller, a pressure outlet opening 13, and an outlet channel 14 for the by-pass liquid.

The principle of operation is as follows: A gaseous liquid flows into the impeller 1 from the suction inlet opening 11. The central portion of the liquid flows continually from the inlet 11 to the outlet channel 14 through the by-pass opening 12 of the impeller. The flow capacity is improved by the screw 5. Liquid which flows to the outlet 13 through the flow channels 6 in the impeller 1 is drawn from the outer periphery of the flow in question. The free gases separate at the suction inlet opening 11, and the gases which have gathered on the front face of the centrifugal impeller 1 are discharged from the impeller by the by-pass liquid flow.

FIG. 1 describes only one possible embodiment. The shape of the centrifugal impeller may be any impeller shape known. Also a so-called closed or a 2-sided open impeller, depending on the liquid type, is suitable for the solution. The diameter d of the by-pass opening may be equally as large, or smaller than the diameter D of the suction opening, or, the by-pass opening may be formed by several small openings, if the flow can be accomplished by a separate screw wheel, or, if the by-pass is guided into a space, the pressure of which is smaller than that in the suction opening of the impeller.

The screw 5 can be substituted with propeller-like blades or bars.

By extending the shaft to the suction opening, the rotation of the liquid and the separation of the gases become more efficient. The shaft may be provided with vanes which increase the rotation.

Figure 2:
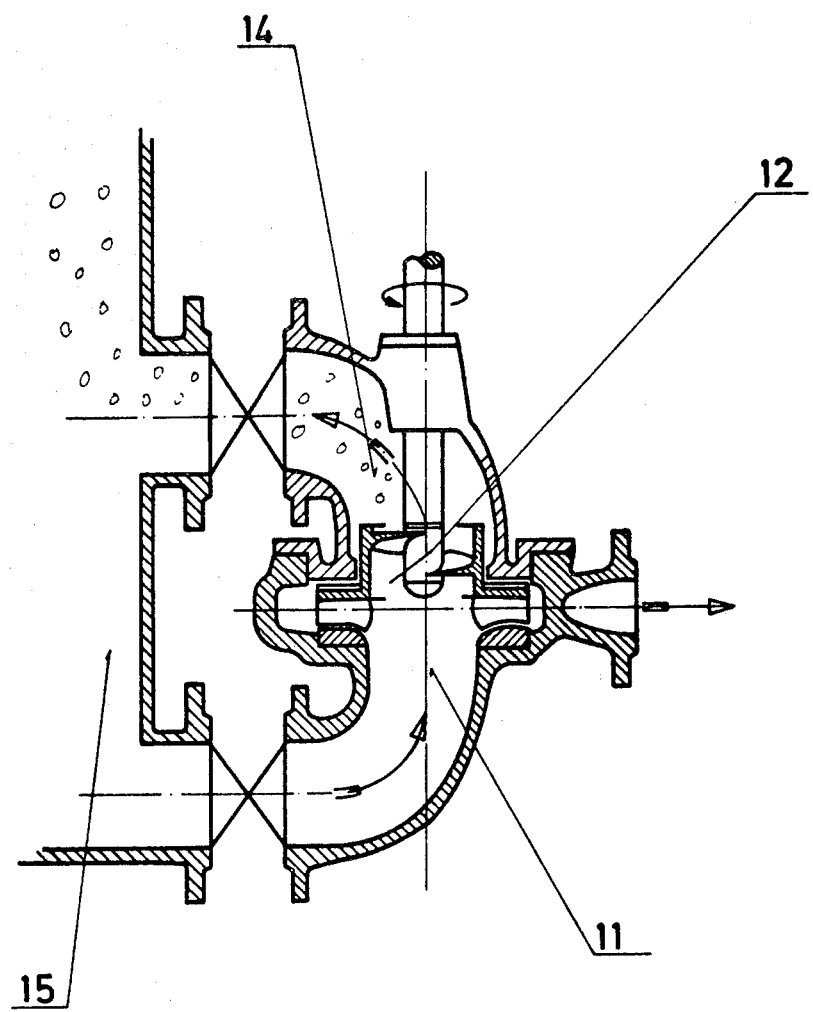

FIG. 2 describes an example of a centrifugal pump application with a by-pass impeller. The pump, into which liquid flows from a reservoir 15 in the suction opening 11, is of vertical construction. The liquid-gas mixture flowing through the by-pass openings 12 is caused to flow immediately back to the reservoir through the outlet channel 14. The separated air may freely arise to the surface in the reservoir as bubbles. The quantity of the by-pass liquid should preferably be 5–50% of the quantity flowing to the pump.

I claim:

1. A method for pumping gaseous liquids in a centrifugal pump having a rotary impeller with vanes defining a first set of passages, and an opening through said impeller defining a second passage, which method comprises introducing into the pump an inflowing stream of gaseous liquid, dividing said inflowing stream at the impeller into two outflowing streams, one of said outflowing streams containing the greater part of the gaseous content of said inflowing stream and passing through said second passage, and the other of said outflowing streams passing through said first set of passages; and positively driving said one outflowing stream through said second passage by a surface extending into said second passage and rotating with the impeller.

2. A method according to claim 1 wherein the quantity of flow through said second passage is between 5% and 50% of the flow of said inflowing stream of gaseous liquid.

3. A centrifugal pump having a rotary impeller, an opening through said impeller defining a passage for the flow of a gaseous fluid stream and an improved entrained gas separating structure, which improvement comprises means defining at least one surface connected to the impeller for rotation therewith and extending into said passage to positively drive therethrough such gaseous fluid stream.

4. The centrifugal pump according to claim 3 wherein said means defining said surface is a screw plate, and including a ring on said impeller surrounding said opening and connected to said screw plate, and a shaft connected to said screw plate to rotatably drive the impeller.

* * * * *